United States Patent
Walker et al.

(10) Patent No.: US 8,271,474 B2
(45) Date of Patent: Sep. 18, 2012

(54) AUTOMATED SYSTEM AND METHOD FOR CREATING A CONTENT-RICH SITE BASED ON AN EMERGING SUBJECT OF INTERNET SEARCH

(75) Inventors: Hubert M. Walker, Berkeley, CA (US); Noel C. Morrison, San Francisco, CA (US); Ankarino S. Lara, San Francisco, CA (US); Scott Bedard, San Francisco, CA (US); Timothy Caplis, Oakland, CA (US); Conor John Egan, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 685 days.

(21) Appl. No.: 12/165,548

(22) Filed: Jun. 30, 2008

(65) Prior Publication Data

US 2009/0327275 A1    Dec. 31, 2009

(51) Int. Cl.
G06F 17/30    (2006.01)
(52) U.S. Cl. .................................................. 707/708
(58) Field of Classification Search .................. 707/706, 707/708–710
See application file for complete search history.

(56) References Cited

U.S. PATENT DOCUMENTS

| | | | |
|---|---|---|---|
| 6,199,081 B1 | 3/2001 | Meyerzon et al. |
| 6,356,899 B1 | 3/2002 | Chakrabarti et al. |
| 6,466,940 B1 | 10/2002 | Mills |
| 6,868,435 B2 | 3/2005 | Boys |
| 6,934,277 B1 | 8/2005 | Werve et al. |
| 6,987,221 B2 | 1/2006 | Platt |
| 7,143,193 B1 | 11/2006 | Abbott et al. |
| 7,162,473 B2 | 1/2007 | Dumais et al. |
| 7,185,092 B2 | 2/2007 | Furui et al. |
| 7,356,589 B2 | 4/2008 | Abbott et al. |
| 7,526,545 B2 | 4/2009 | Jerome |
| 7,581,006 B1 | 8/2009 | Lara et al. |
| 7,725,422 B2 | 5/2010 | Ryan et al. |

(Continued)

OTHER PUBLICATIONS

Hoebel, Natascha and Zicari, Roberto, "Creating User Profiles of Web Visitors using Zones, Weights, and Actions," Jul. 21-24, 2008, 10th IEEE Conference on E-Commerce Technology, pp. 190-197.

(Continued)

*Primary Examiner* — Thu-Nguyet Le
(74) *Attorney, Agent, or Firm* — Martine Penilla Group, LLP

(57) ABSTRACT

Embodiments of the present invention provide automatic systems and methods for creating a web site based on an emerging subject, which is also a search keyword, by analyzing search activities (or data) of Internet users of a popular Internet search engine. Analysis of search activity data of the Internet search engine can also provide search keywords that are most related to the emerging subject, and Internet sites with content relevant to the emerging subject. To create such a web site that is of interests to Internet users, the emerging subject and related search keywords mentioned above can be searched on Internet sites identified to have content relevant to the emerging subject. The search results are used to populate databases for this web site. After the web site is created and launched, users of the site can contribute to the content of the site. In addition, active users of the web site can engage in basic administration of the site, which reduces the need of intervention by paid administrators. Thus, by obtaining content from Internet sites, coupled with contributions made by users, it is possible to automatically create and maintain new custom created sites with minimal intervention by paid administrators.

19 Claims, 9 Drawing Sheets

U.S. PATENT DOCUMENTS

| | | |
|---|---|---|
| 7,801,845 B1 | 9/2010 | King et al. |
| 7,933,864 B1 | 4/2011 | King et al. |
| 2002/0147637 A1 | 10/2002 | Kraft et al. |
| 2003/0028896 A1 | 2/2003 | Swart et al. |
| 2004/0102248 A1 | 5/2004 | Young et al. |
| 2004/0111484 A1 | 6/2004 | Young et al. |
| 2005/0021611 A1 | 1/2005 | Knapp et al. |
| 2006/0004704 A1 | 1/2006 | Gross |
| 2007/0078842 A1 | 4/2007 | Zola et al. |
| 2007/0282693 A1* | 12/2007 | Staib et al. .................. 705/26 |
| 2008/0168135 A1 | 7/2008 | Redlich et al. |
| 2008/0195664 A1 | 8/2008 | Maharajh et al. |
| 2009/0100078 A1 | 4/2009 | Lai et al. |
| 2009/0234876 A1 | 9/2009 | Schigel et al. |
| 2009/0254529 A1 | 10/2009 | Goldentouch |
| 2009/0327275 A1 | 12/2009 | Walker et al. |
| 2009/0327923 A1 | 12/2009 | Walker et al. |
| 2010/0030578 A1 | 2/2010 | Siddique et al. |
| 2010/0082573 A1 | 4/2010 | Canel et al. |
| 2010/0082575 A1 | 4/2010 | Walker et al. |

OTHER PUBLICATIONS

Hung, Chia-Chuan, et al., "Tag-Based User Profiling for Social Media Recommendation," May 18, 2008, Association for the Advancement of Artificial Intelligence, pp. 49-55.

\* cited by examiner

| ID | | Description | Tag(s) | Photo File |
|---|---|---|---|---|
| xxxxx | yyyyy | Uzumahi Naruto | Uzumahi Naruto, Shippuden | Photo File 1 |
| ⋮ | ⋮ | ⋮ | ⋮ | ⋮ |
| | | | | |
| ⋮ | ⋮ | ⋮ | ⋮ | ⋮ |
| ⋮ | | ⋮ | ⋮ | ⋮ |

AUTOMATED SYSTEM AND METHOD FOR CREATING A CONTENT-RICH SITE BASED ON AN EMERGING SUBJECT OF INTERNET SEARCH

CROSS REFERENCE TO RELATED APPLICATION

This application is related to U.S. patent application Ser. No. 12/165,537, entitled "Automated System and Method for Creating a Web Site Based a Subject Using Information Available on the Internet," which is filed on the same date as the current application. The disclosure of the related application is incorporated herein by reference in its entirety for all purposes.

BACKGROUND OF THE INVENTION

1. Field of the Invention

The present invention relates to an automated system and method that searches the Internet for information to create a web site. More particularly, the present invention relates to an automated system and method that searches the Internet for information to create a web site based on a number of search terms relevant to a particular subject.

2. Description of the Related Art

Internet web sites are built to provide information and services to meet the demands of various Internet users. Internet web sites can provide information and services through, but not limited to, text, photos, videos, audio, and applications, such as games and interactive online tools. For example, some web sites provide transaction functions to achieve e-commerce goals. Web sites are built to achieve goals of owners of the web sites. The exemplary goals include, but are not limited to, attracting potential buyers, building brands, introducing products, information exchange, social networking, etc. Web site content is presented to users in web pages, typically written in HyperText Markup Language (HTML), which are accessible via Hypertext Transfer Protocol (HTTP). The content of the web sites is typically stored in databases, which are used to create web pages handled by programs run on web servers.

Constructing (or building) a web site can consume a lot of time and resources, such as people, hardware, and software. Builders of a web site need to decide what content is relevant and interesting to the target users. The builders also need to design the layout of the web site, decide the type of software and hardware needed, place data in databases, etc. After the web site is built, administrators are needed to maintain the operation of the web site, such as adding new content to the web site, deleting outdated, incorrect, or inappropriate content from the web site, and to keep the hardware systems running, etc. All these activities consume resources and time. Further, information relevant and interesting to Internet users evolves at a very fast pace. Global trends and Internet user population also change constantly. Thus, Internet users demand updated and relevant content. If the content is not provided, users may go to other sites that provide the content they desire.

It is in this context that embodiments of the present invention arise.

SUMMARY OF THE INVENTION

Millions of Internet users conduct searches each day to find information, products and services that may be of interest. Web sites with popular Internet search engines often track Internet users' search activities, which can be analyzed to identify a momentum shift of interest of Internet users and to identify emerging trends. Building web sites based on these specific subjects can bring Internet traffic to such sites and can increase advertising opportunities to such sites.

Embodiments of the present invention provide automatic systems and methods for creating a web site based on an emerging subject, which is also a search keyword, by analyzing search activities (or data) of Internet users of a popular Internet Search engine. Analysis of search activity data of the Internet search engine can also provide search keywords that are most related to the emerging subject, and Internet sites with content relevant to the emerging subject. As discussed above, creating and maintaining a web site with updated content can be very time and resource consuming. Therefore, it is desirable to create and maintain such a site with an automatic system and method using information available on the Internet. To create such a web site that is of interests to Internet users, the emerging subject and related search keywords mentioned above can be searched on Internet sites identified to have content relevant to the emerging subject. The search results are used to populate databases for this web site. After the web site is created and launched, users of the site can contribute to the content of the site, User contribution of additional content to a web site keeps the web site updated and interesting to all users of the site. Further, searching on Internet sites is configured to continuously add content that is new and relevant to the web site. In addition, active users of the web site can engage in basic administration of the site, which reduces the need of intervention by paid administrators. Thus, by obtaining content from Internet sites, coupled with contributions made by users, it is possible to automatically create and maintain new custom created sites with minimal intervention by paid administrators.

It should be appreciated that the present invention can be implemented in numerous ways, including as a method, a system, or a device. Several inventive embodiments of the present invention are described below.

In one embodiment, a method for automatically creating a web site based on an emerging subject of Internet search is provided. The method includes analyzing search data of an Internet search engine to identify the emerging subject in Internet search to create the web site based on the emerging subject. The method also includes analyzing the search data of the Internet search engine to identify search keywords that are most relevant to the emerging subject and to identify Internet sites that have content most relevant to the emerging subject. The method further includes initiating a search for content for the web site via a search engine based on the identified search keywords on the identified Internet sites. In addition, the method includes automatically creating the web site based on the emerging subject. At least a portion of the content of the web site is obtained from search results of the search initiated, wherein the web site is made accessible to users.

In another embodiment, a method for automatically creating a web site based on an emerging subject of Internet search is provided. The method includes analyzing search data of an Internet search engine to identify the emerging subject in Internet search to create the web site based on the emerging subject. The method also includes analyzing the search data of the Internet search engine to identify search keywords that are most relevant to the emerging subject and to identify Internet sites that have content most relevant to the emerging subject. The method further includes initiating a search for content for the web site via a search engine based on the identified search keywords on the identified Internet sites. In addition, the method includes automatically creating the web site based on the emerging subject. At least a portion of the content of the web site is obtained from search results of the search initiated. Non-text-based content of the web site can be tagged by users of the web site to assist searching.

In yet another embodiment, a system for automatically creating a web site based on an emerging subject of Internet search is provided. The system includes a multimedia storage for saving media files related to the subject of the web site, and a member storage for saving information related to members of the web site. The system also includes a search engine configured to search a plurality of web sites for content related to a plurality of search keywords related to the subject of the web site, and wherein search results of the search engine populate the photo storage, and the video storage to automatically create the web site. The system further includes a content server configured to prepare web pages of the web site in responses to requests from users of the web site. The photo storage, the video storage, and the member storage provide content for the web site. The system is connected to an Internet search engine that identifies the emerging subject of Internet search.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

As mentioned above, millions of Internet users conduct searches each day to find information, products and services that may be of interested. Web sites with popular Internet search engines often track Internet users' search activities, which can be analyzed to identify a momentum shift of interests of Internet users and to identify emerging trends. Building web sites based on these specific subjects can bring Internet traffic to such sites and can potentially bring advertising opportunities to such sites.

The information tracked by popular Internet search engines often may include the search keywords entered, the time of the entering, the geographical locations of search users, and demographic of the search users, etc. Users' search activities can be analyzed to identify momentum shift of interests of Internet users, which include entertainment, brands, products, and services etc. Online advertising and E-commerce have increasingly gaining popularity over the years. Creating web sites based on subjects (or theme) that are of latest interests of large number of Internet users can stand to gain Internet user traffic and advertising revenue.

Figure 1A:
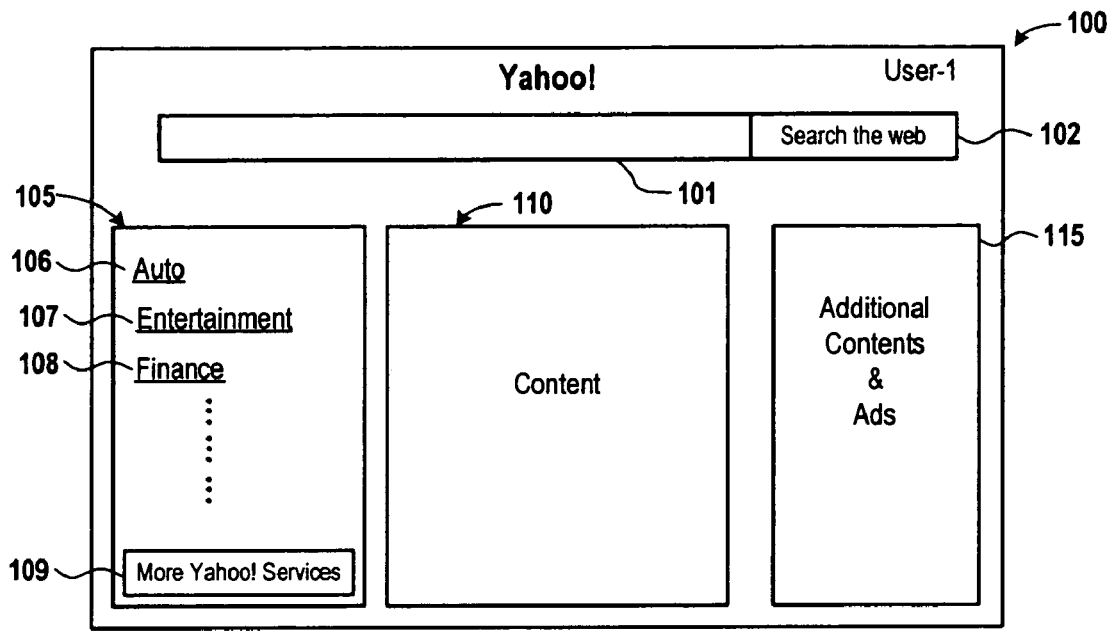
FIG. 1A shows an entry page of a portal for a user, in accordance with one embodiment of the present invention.

FIG. 1A shows an entry page 100 of a portal with a popular search engine, such as Yahoo!, for a user, User-1, in accordance with one embodiment of the present invention. User-1 can access the entry page 100 by type in the Uniform Resource Locator (URL) of the portal, such as "www.yahoo.com." In entry page 100, there is a search box 101 and a "Search The Web" button 102 near the top of page 100. User-1 can enter a search term, which can be a word or a phrase, in the search box 101 and push the "Search The Web" button 102 to initiate a search.

In one embodiment, on the left side of entry page 100, there is a directory field 105, which includes a list of directories with different subjects and links, such as Auto link 106, Entertainment link 107, and Finance link 108, etc. Below the list of directories, there is a button 109 for "More Yahoo! Services," which can be clicked to access additional service directory not listed in the directory field 105. These directories are services provided by Yahoo!. They include many subjects, such as auto, entertainment, finance, games, weather, maps, and jobs, etc. in the middle of the entry page, there is a content field 110, which contains information for User-1 to view. On the right side of entry page 100, there is a field 115 with additional content and advertisements. User-1 can click on the Entertainment link 107 to access information services related to entertainment provided by Yahoo!.

As discussed above, users' search activities, including search keywords entered by users, are tracked (or recorded) by the Yahoo!. Yahoo! (or administrators of Yahoo!) analyzes search activities of users and is aware of emerging trends of interests of online users. From the analysis of search activities, Yahoo! can identify a number of subjects that are gaining popularity amongst Internet users and have high advertising opportunities. For example, "cosplay", short for "costume play", is a subculture centered on dressing as characters from manga (or comics), anime (or animation), tokusatus (or films and dramas with special effects), video games, television shows, fantasy movies, pop music bands, novels, and anything in the real world being unique and dramatic. Cosplay is originated in Japan and is gaining popularity outside of Japan in many countries, including United States, Canada, United Kingdom, Mexico, France, Australia, etc. Cosplayers (people participates in cosplay) dress up in costumes of their favorite characters for cosplay parties and conventions. Cosplayers also read cosplay magazines. Examples of popular characters include, but not limited to, "Uzumaki Naruto" of "Naruto" manga, "Sailor Senshi" (or Sailor Soldier) of "Sailor Moon" manga, and "Princess Leia" of "Star Wars™" movie. There are merchants organizing conventions for cosplayers to attend with entrance fees. There are also merchants who sells costumes of popular cosplay characters. Some of these merchants advertise their products on Internet web sites. Cosplayers are very enthusiastic about their subculture. Creating a web site based on cosplay can attract numerous cosplayes around the world to the site. Some of these cosplayers would view ads on the site and make purchases of products and services promoted in the ads.

Figure 1B:
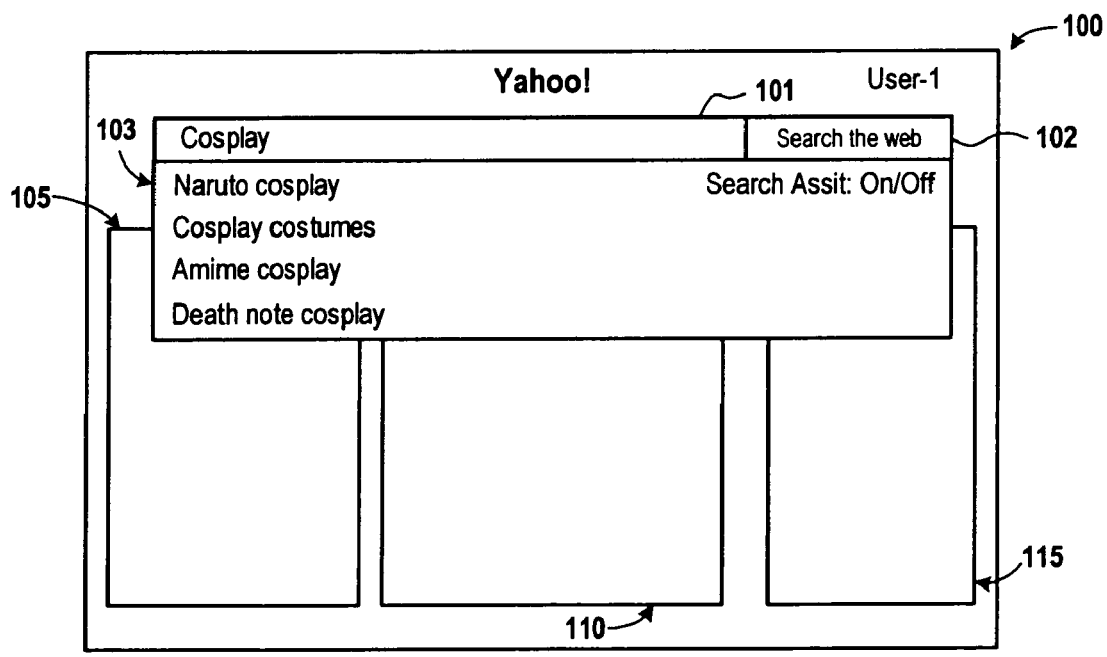
FIG. 1B shows an entry page of a portal for a user, in accordance with another embodiment of the present invention.

The analysis of search activities of Internet users would also reveal popular search keywords, which can be words or phrases, related to certain search subjects, such as "cosplay". For example, the search engine of Yahoo! offers "assisted search" function, which provides search keywords related to the search key that the user is currently typing. For example, if User-1 types "cosplay" in the search box 101 of FIG. 1A, a field 103 of related search keywords would appear below search box 101, as shown in FIG. 1B in accordance with one embodiment of the present invention. In field 103 of related search words, a number of search keywords related to "cosplay" are shown. The informational service provided in field 103 can be referred to as "Search Assist." Additional search keywords related to the search keyword entered are provided to users to assist users finding information on the Internet. In the example shown in FIG. 1B, search keywords that are related to "cosplay" includes "naruto cosplay," "cosplay costumes," "anime cosplay," and "death note cosplay," etc. These related search keywords are identified based on analysis of search activities of Yahoo! search engine. They are most popular search keywords that are related to "cosplay."

An entertainment-based web site can be created based on current trend in Internet activities and/or momentum shift, based on search activities. Such an entertainment-based web site can engage many Internet users to view content of the site, to interact with the web site, such as uploading files, making comments, joining questions and answers, and entering blogs. Advertisers can display advertisements to promote products and services that are of interests to users of the web site. When users of the web site view the advertisements, the owner(s) of the web site stands to make financial gains due to the site. Popular search engines, such as Yahoo! search engine, engages millions of online users every day to search for content of their interests. By analyzing the search activities of these search users, the companies that own the search engines can identify latest trends and popular subjects. Building web sites based on latest trends and popular subjects that are of potential commercial or advertising value can bring user traffic to the site and bring advertising revenue to the companies that own the sites.

The types of web site that should be created based on current trends in Internet activities and/or momentum trends can be determined by the number of users making searches or related searches on the subject. For example, a company, such as Yahoo, that owns a search engine can determine that when a threshold of number of users searching for a particular subject has been reached, a web site related to the subject should be created. Alternatively, the company that owns a popular search engine can also determine to create a web site based on a subject when the interest rate of the subject reaches a certain threshold. For example, the total number of users conducts searches related to "cosplay" might not be the highest. However, if the trend shows that there is a high rate of increase of users interested in the subject, which makes the subject an "emerging subject", this can justify a site related to such a subject be created. The high number of searches and/or high rate of increase might need to be over certain periods to make sure that the trend would continue. The thresholds of number of searches, the rate of increase in searches for subjects over what period of time that justify setting up a web site can be determined by administrators or business people.

As mentioned above, analysis of search activities would reveal search terms (or keywords), which are related to each search keyword. These related search keywords in field 103 can be used to assist creating a web site based on a popular or emerging search subject.

As described above, web sites are created to meet demands of various Internet users. One of the demands is having a web site to allow users interested in a particular subject to view information of the particular subject, to interact with one another through information exchange, such as sharing photos, videos and music, etc., and to discuss the topics related to the particular subject through tools, such as message boards, blogs, and questions and answer, etc. For example, there are many people (or fans) interested in "cosplay." Some of these people are very devoted to the cosplay costumes, characters, and events of cosplay. They purchase or make cosplay costumes in various cosplay characters to attend cosplay events, which are held in different parts of the world regularly. For example, some fans of Star Wars™ movie series dress themselves as Princess Leia or other characters of Star Wars™. Fans in Japan might dress in characters in Bleach series to attend Bleach party. People interested in cosplay read manga, watch anime, and play videos of their favorite series and/or characters. They also view photos, and videos related to cosplay. These fans of cosplay would be very interested in having a web site on the subject of "Cosplay," where they can read articles about cosplay, view photos and videos related to cosplay, find merchandises related to cosplay, and exchanges information with other cosplay fans, etc.

General portal sites, such as Yahoo!, or other entertainment-related, sports-related, or social-networking-related portal sites creates web sites that interest Internet users. A web site with a theme (or subject) on "Cosplay" would attract many Internet users, who are interested in cosplay or are fans of cosplay. As discussed above, constructing (or building) a web site can be very time and money consuming. Further, after the web site is built, administrators are needed to maintain the operation of the web site, such as adding new content to the web site, deleting outdated, incorrect, or inappropriate content from the web site, and keep the hardware systems running, etc. All these activities consumes resources and time. Therefore, it would be desirable to have an automated system and method for creating and maintaining such a site. The figures and description below provide embodiments of how a web site with particular subject, such as "cosplay," interesting to numerous Internet users could look like and what information and services the web site could have. Systems and methods to automatically create the web site are also provided. The "Cosplay" web site can be categorized under entertainment or other categories in a portal, such as Yahoo!. In the example here, the Cosplay web site is placed under "Entertainment" category.

Figure 1C:
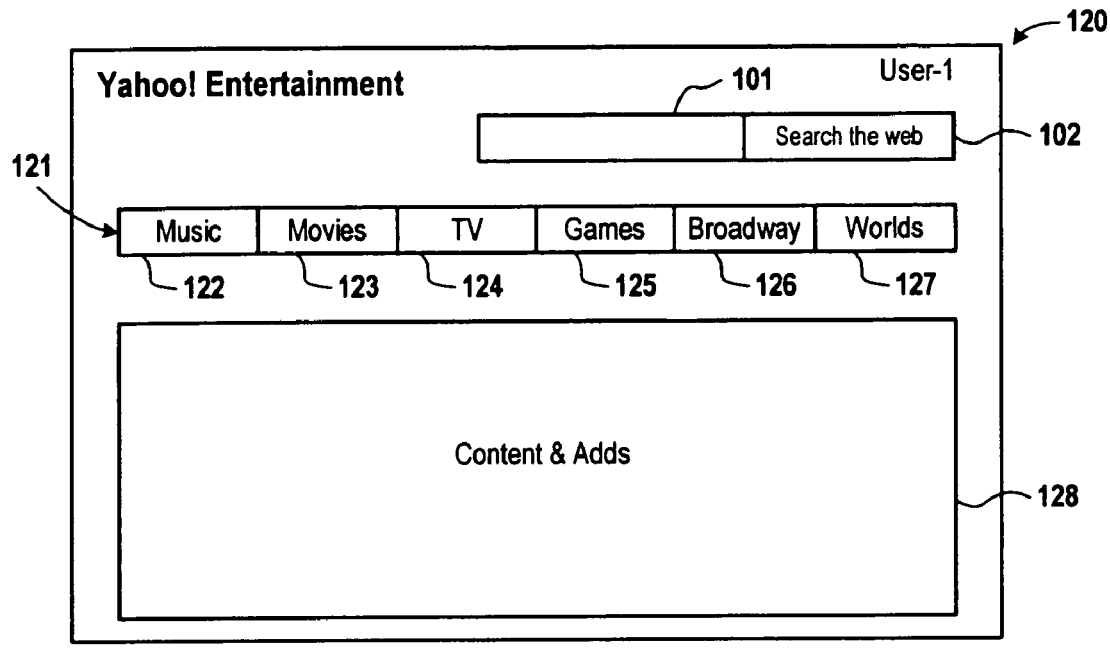
FIG. 1C shows an Entertainment entry page for a user, in accordance with one embodiment of the present invention.

As mentioned above in FIG. 1A, there is an Entertainment link 107 in the directory field 105. When User-1 clicks on the Entertainment link 107, an Entertainment entry page 120 for the Yahoo! Entertainment directory is opened (as shown in FIG. 1C), in accordance with one embodiment of the present invention. The Entertainment entry page 120 includes a field 121 of links to different categories of entertainment, such as Music link 122, Movies link 123, TV link 124, Games link 125, Broadway link 126, and Worlds link 127, etc. The Music Link 122, when pressed, would take the user, such as User-1, to a web page with information related to music and music industry, and additional links to music-related subjects. Similarly, Movies link 123, TV link 124 and Games link 125 would take the user to web pages related to movies, TV shows, and video games. The Worlds link 127 would take the user to a web page with information related to different "Worlds" created for different popular subjects that are of interests to online users. For example, the different "Worlds" include web site for Star Wars™ movies, which is named as "The World of Star Wars™," and web site for cosplay, which is named as "The World of Cosplay," etc. The Entertainment entry page 120 also include a field 128 of content and ads, which has entertainment-related content and ads for User-1 to view.

Figure 1D:
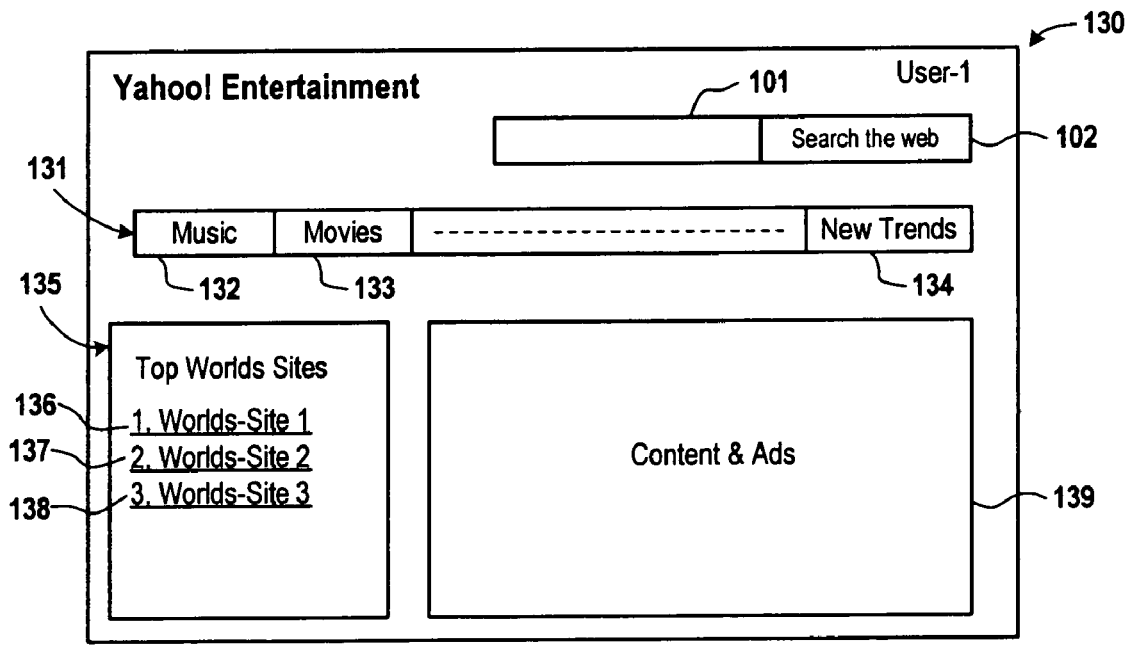
FIG. 1D shows a Worlds entry page for a user, in accordance with one embodiment of the present invention.
Figure 1E:
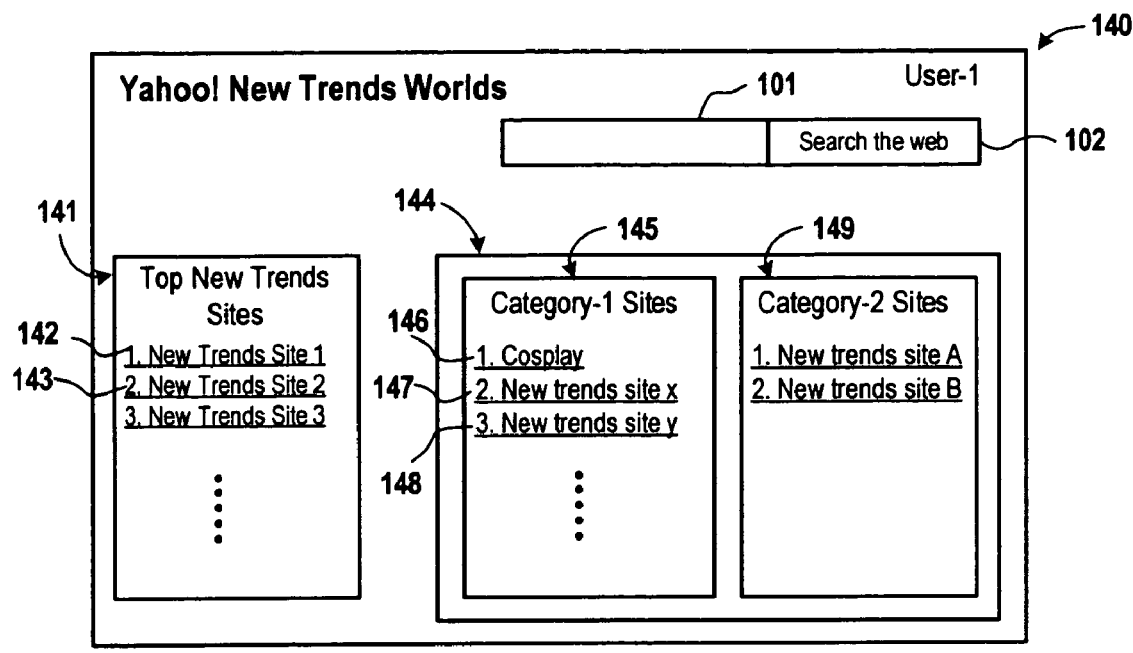
FIG. 1E shows the entry page of New Trends Worlds, in accordance with one embodiment of the present invention.

When User-1 clicks on the Worlds link 127, a Worlds entry page 130 is opened, in accordance with one embodiment of the present invention. In the Worlds entry page 130, there are web sites created for users based on different categories of entertainment, as shown in FIG. 1D in accordance with one embodiment of the present invention. Entry page 130 includes a directory field 131, which has a list of category links, such as link to Movies category 132, link to Music category 133, and ink to New Trend category 134, etc. As mentioned, different sites are listed under different categories. For example, the site of "The World of Cosplay" is listed under the category of "New Trends," and can be accessed by pressing the link to New Trends category 134. On the left side of entry page 130, there is a field 135 of top Worlds sites with a list of most popular sites under the "Worlds" category, such as Worlds-Site-1 136, Worlds-Site-2 137, and Worlds-Site-3 138, etc. In the middle of page 130, there is a field 139 of content and ads, which contain content related to the "Worlds," and ads for User-1 to view To find a "Worlds" site of a particular subject, such as "The World of Cosplay" site, User-1 can click on the link to New Trends category 134, which list sites related to new trends (or emerging) in the Internet. Alternatively, User-1 can click on the site link directly if the link to the site is available on the front page, such as among the links for the top Worlds sites in field 125. In the examples here, User-1 clicks on the link to New Trends 134 to access an entry page of New Trends Worlds 140. FIG. 1E shows the entry page of New Trends Worlds 140, in accordance with one embodiment of the present invention. In page 140, there is a field 141 for top New Trends sites, which includes a list (with links) of most popular (top) New Trends sites under the Worlds section of Yahoo! Entertainment. In the example shown in FIG. 1E, the top sites for the New Trends Worlds are "New Trends Site 1" 142, and "New Trends Site 2" 143, etc. To the right of the field 141 for top New Trends sites, there is a field 144 for list of Worlds sites related to New Trends. In one embodiment, in field 144 there is an area 145 of Category-1 Sites, which includes links to New Trends sites categorized under category-1, such as "Cosplay" 146, "New Trends Site X" 147, and "New Trends Site Y" 148, etc.

In field 144, there is also an area 149 for Category-2 sites, which includes a list of New Trends sites categorized under category-2, such as New Trends site A, New Trends site B, etc. Sites related to New Trends can be placed under different categories that are easily understood by Internet users. The categories for New Trends sites can be any subject (or description) that properly describes the categorizing group. For example, one of the categories can be New Trends in North America. Another example of category can be New Trends in Asia, etc. The layout and categories listed in the entry page 140 are merely examples. Other types of layout and categories are also possible.

Figure 1G:
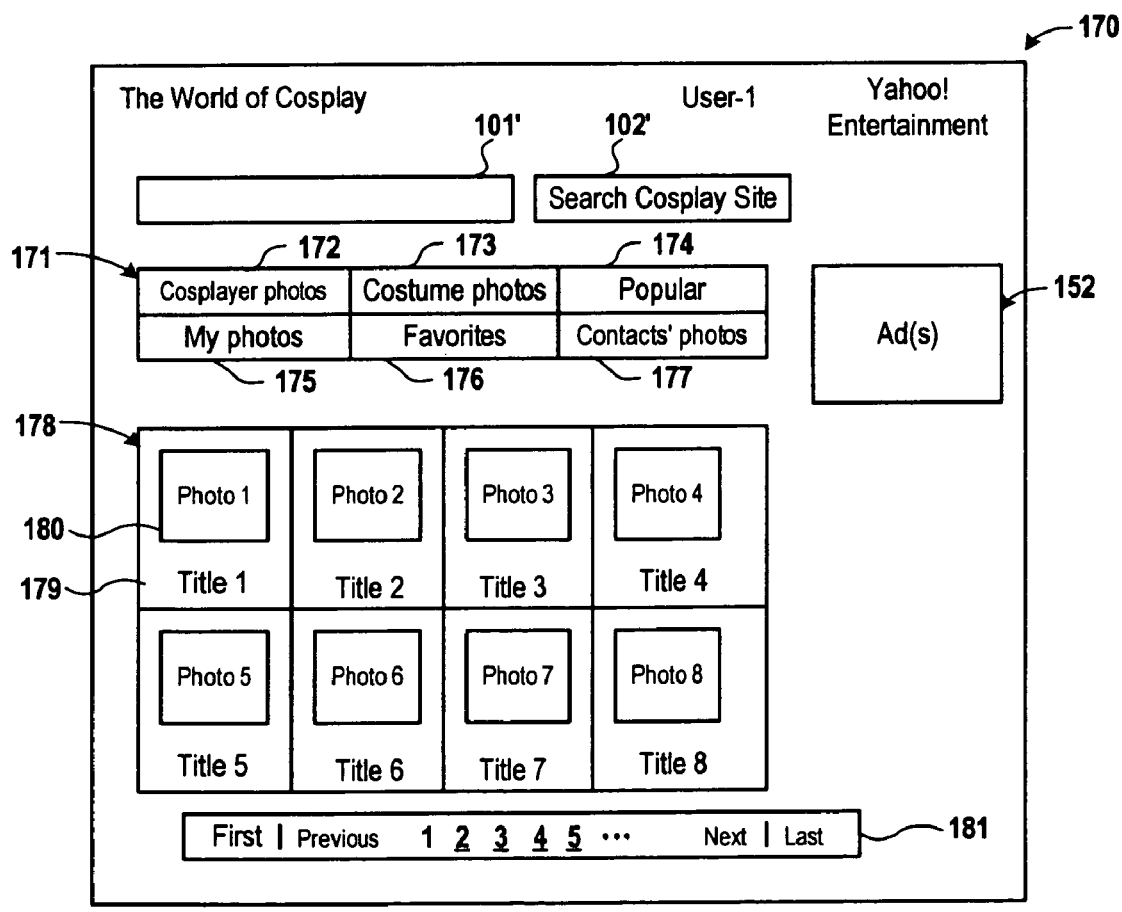
FIG. 1G shows a web page to access all photos in the Cosplay site, in accordance with one embodiment of the present invention.
Figure 1F:
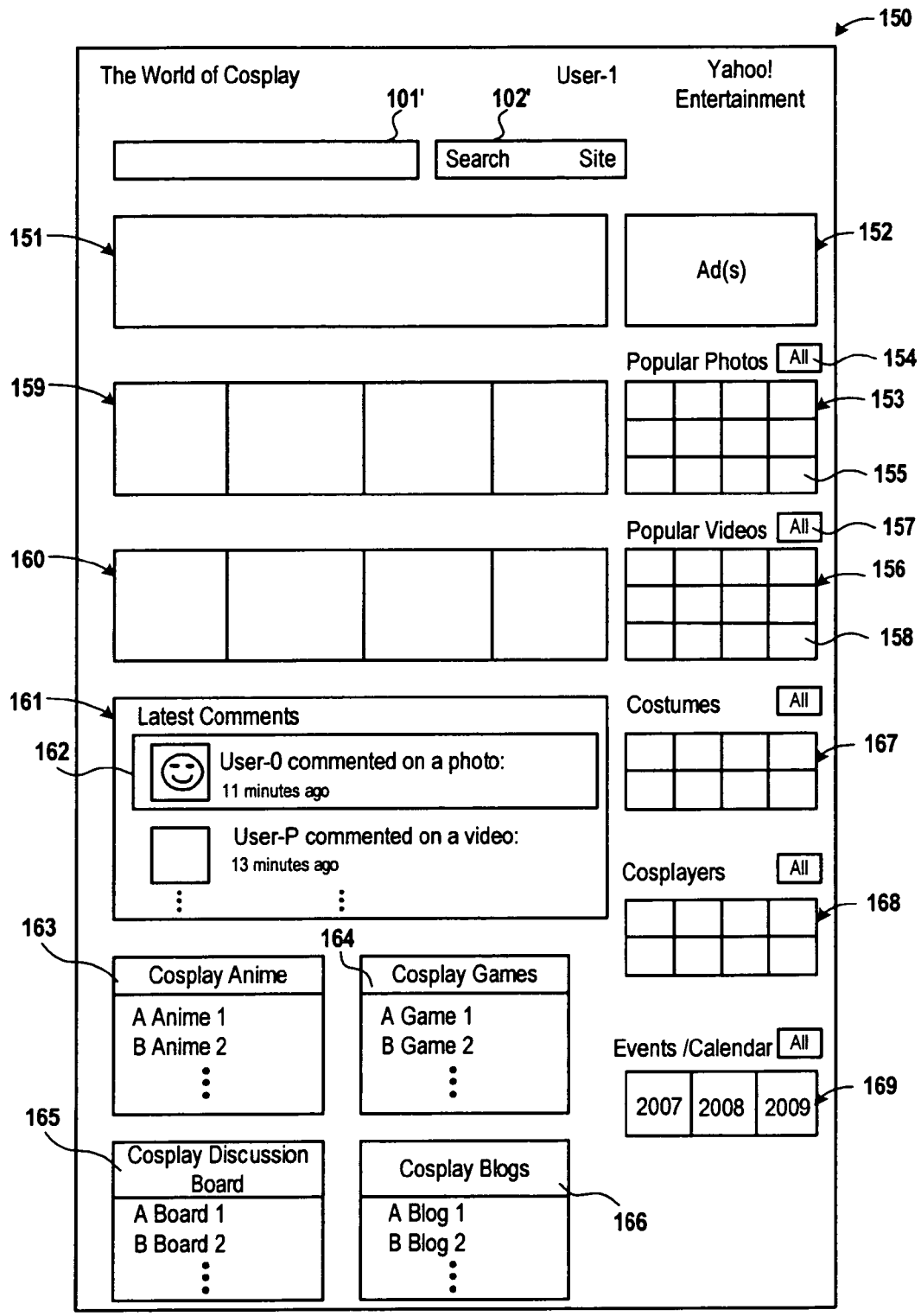
FIG. 1F shows an entry page for the Worlds site of Cosplay, in accordance with one embodiment of the present invention.

When User-1 clicks on the link to "Cosplay" site 146, an entry page 150 for the Worlds site of Cosplay appears with the title of the page being "The World of Cosplay" as shown in FIG. 1F, in accordance with one embodiment of the present invention. On entry page 150, there is a search box 101', which allow User-1 to enter a search key word, which can be a word or a phrase. Next to the search box 101', there is a search button 102', which, when pressed, allows User-1 to search for content in the current "The World of Cosplay" site. In one embodiment, the content in the current site includes costumes, event calendar, members (cosplayers), discussion boards, blogs, photos and videos related to cosplay. Cosplay fans like to be dressed in costumes and show their photos or avatars to other cosplay fans; therefore, information related to costumes and members, which can include photos or avatars of members, are important. Further, cosplayers are known to like to attend parties and events of cosplay; therefore, event calendar could also be an important item for the site. Many users (or members) of the World of Cosplay site would also like to exchange their views with other users via discussion boards, and blogs, and share their photos and/or video with other users. Therefore, making these functions and information available on the site would meet the users' needs.

Below the search box, there is an area 151 for lead article of Cosplay, which can include text and photos related to the lead article. In one embodiment, the lead article can be uploaded by a user of the site, such as by the most active user or by the user who has uploaded the most photos and/or videos or comments (such as in discussion boards and/or blogs) to the site, etc. In another embodiment, the lead article is assigned by an administrator of the site. Alternatively, other algorithm can be used to select lead article, such as by highest votes received from users of the group, etc.

To the right of the lead article, there is an area 152 for one or more advertisements. In one embodiment, the advertisements are related to cosplay. For example, the advertisements can be for costumes, games, books, movies, events, and toys related to cosplay, etc. In another embodiment, the advertisements target the users of the Cosplay site. For example, the users of the site might be mostly teenagers and young adults, etc. The advertisements may be targeted to teenagers and young adults who like fashions, games, and anime, etc.

Below the area 152 for ad(s), there is an area 153 for a number of popular photos related to cosplay. Area 153 is sub-divided into small sections, such as section 155. Each section, such as section 155, contains a photo related to Cosplay. Above the area of popular photos, there is an "All" button 154. When the "All" button 154 is pressed, a page 170 to access all photos in the Cosplay site appear, as shown in FIG. 1G in accordance with one embodiment of the present invention. In page 170, the search box 101', search button 102', and the ad(s) area 152, that are similar to those on entry page 150, still exist. Under the search box 101', there is an area 171 with buttons for photos under different categories. For example, the buttons of categories can include "Cosplayer photos" 172, which allows access to photos (including avatars) uploaded by users, "Costume photos" 173, which shows photos of cosplay costumes, and "Popular" 174, which allows quick access to most popular photos. The buttons of categories can further include "my photos" 175, which allows access to photos uploaded by User-1, "Favorites" 176, which allows access to favorite photos marked by User-1, and "contacts' photos 177, which allows access to photos uploaded and/or marked as favorites by other users, who are in User-1's contact list. Below the area 171, there is a field 178 for photos, which is divided into a number of areas, such as area 179. In each area, such as area 179, there is a photo, such as "photo 1" 180, and a title, such as "Title 1", of the photo.

Below the field 178 for photos, there is an area 181 with links to access other pages of photos. For example, in area 181, there are links to different pages, such as links to pages 2, 3, 4, 5, previous page, next page, first page and last page, etc.

Figure 1H:
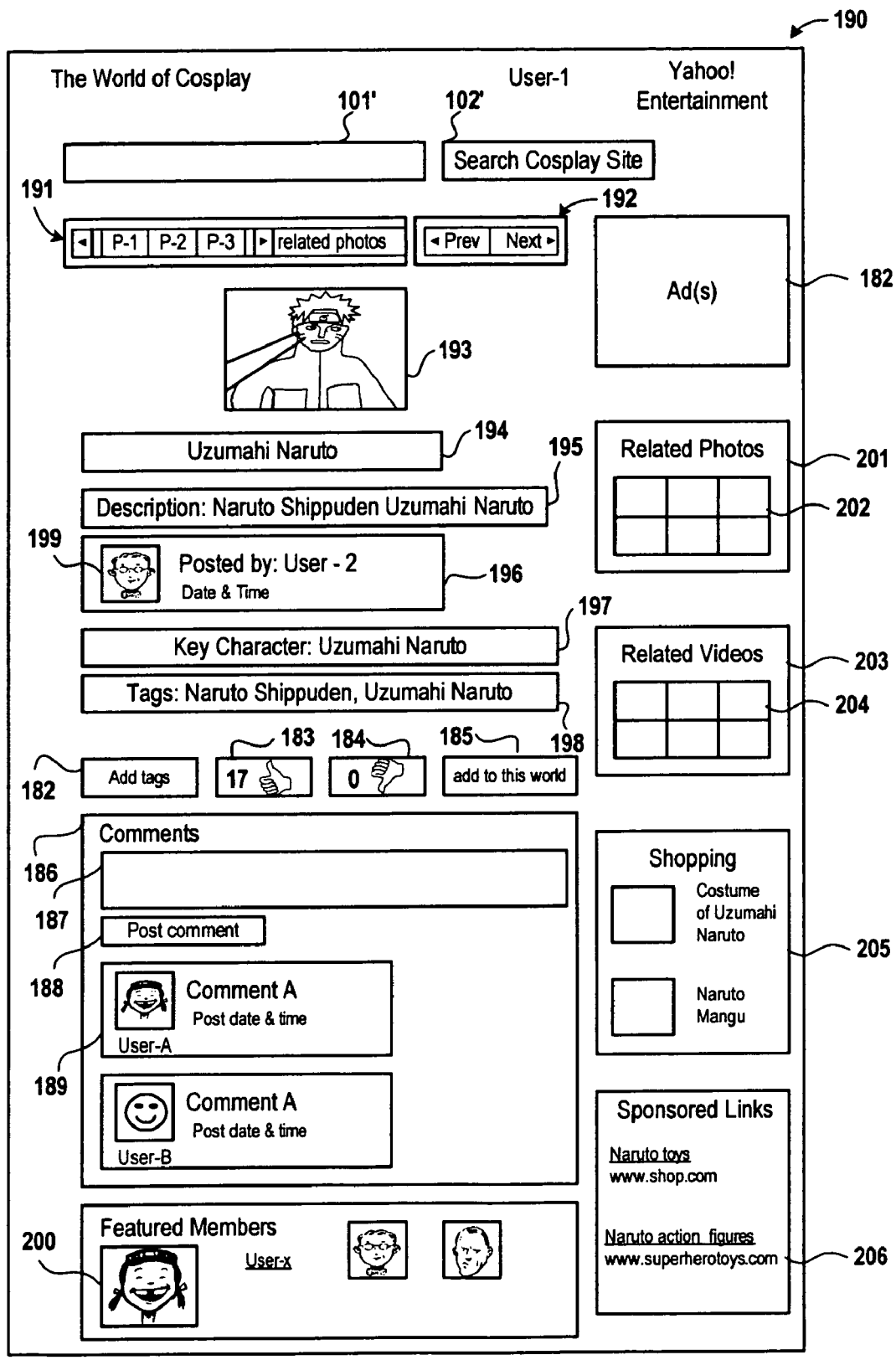
FIG. 1H shows a page with a selected photo, in accordance with one embodiment of the present invention.

Going back to FIG. 1F, area 153 has many sections, such as section 155, of photos. When User-1 clicks on a photo section, such as section 155, a page 190 with photo appears, as shown in FIG. 1H in accordance with one embodiment of the present invention. Alternatively, User-1 can also click on a photo, such as "photo 1" 180, in an area, such as area 179, in page 170 to access a photo. When User-1 clicks on area the "photo 1" 180, a page similar to page 190 with photo would appear.

Page 190 includes the search box 101', search button 102', and the ad(s) area 152, that are similar to those on the entry page 150. Below the search box, there is an area 191 that displays links to other photos, such as P-1, P-2, and P-3, that are related the photo 193 of this page. Photo 193 is the photo in either section 155 or area 179, which has been clicked by User-1. Next to the area 191, there is an area 192, which contains links, such as "Prev" for previous, and "Next" for next, to other pages of photos. At the center of page 190 is the photo 193, selected by User-1. Below the photo 193, there is a title field 194, which shows that the title of the photo 193 is "Uzumaki Naruto" of Naruto manga series. Page 190 also includes a description field 195, which provide further description of the photo. Below the description field, there is an area 196 listing the user who posts (or uploads) the photo 193 and the date and time that photo 193 is posted. In one embodiment, area 196 includes a photo or an avatar of the user who posts photo 193. In the example here, the user who posts photo 193 is User-2. Further, page 190 includes a field 197 of the character of the photo. In this example, the character is Uzumaki Naruto. However, this field is optional, since not all photos are related to known characters of manga, anime, and games, etc. In addition, page 190 includes a field 198 of tags, which lists the tags of photo 193. In the example here, the tags for photo 193 are "Naruto Shippuden", and "Uzumaki Naruto". Naruto Shippuden is an on-going sequel to the original Naruto anime. Uzumaki Naruto in photo 193 is dressed in a different costume in Naruto Shippuden from the original Naruto anime.

Below the field 198 of tags, there is a button 182 for adding tag(s) by User-1. There is also a "thumb-up" button 183 for the user, such as User-1, to push if he/she thinks positive about the photo. There can be a total number of users who voted "thumb-up" for the photo. In the example here, 7 users have voted "thumb-up" for photo 193. Next to the "thumb-up" button 183, there is a "thumb-down" button 184. Further, there could be a button 185 of "add to this world", for users who have not signed up to be a member (or a user) of "The World of Cosplay" to be become a member (or user). Users can push button 185 to become a member.

In one embodiment, there is an area 186 of comments on page 190. There is a box 187 that allows a user to enter comments. There is also a "post comment" button 188 to be pushed after the user enters the comments in box 187. In area 186 of comments, there also are a number of comments posted by different users. For example, comment 189 is posted by User-A. A photo or an avatar of User-A is shown, with a comment (comment A) posted by User-A, and the date and time the comment being posted are shown in area 186. Further, on page 190, there is an area 200 of featured members, which shows the avatars or photos of one or more members of the current site. One of the members can be placed at a more prominent spot with larger photo (or avatar) and name of the fan (or user) in area 200. In the example here, User-X takes the more prominent spot and two other members are also featured in area 200.

In addition to all the features described above, an area 201 of related photos can also exist on page 190. In the area 201 of related photos, photos (with links) related to photo 193 are displayed in sections, such as section 202 in area 201. When a user clicks on the photo, which is also a link, in section 202, a page similar to page 190 with the photo would appear. Photos related to photo 193 are tagged with one or more tag terms of photo 193. Photo 193 is tagged with tag terms that include "Naruto Shippuden" and "Uzumaki Naruto." Therefore, any photo that is tagged with the term "Naruto Shippuden" and/or "Uzumaki Naruto" can appear in area 201. If there are more photos than available sections, such as section 202 in area 201, links or buttons to other pages with additional photos can be available (not shown) for the user to click. Further, there can be an area 203 for related videos. Similar to related photos, related videos can appear in sections, such as section 204, in area 203. Related videos are videos tagged with at least one tag term of photo 193.

On page 190, there also can be an area 205 for shopping, where merchants display items on sale or links to web sites that carry merchandises. The merchandizes can be related to Cosplay, Naruto, Uzumaki Naruto, or other subjects that the merchants think a user, such as User-1, would be interested in. In the example here, costume of Uzumaki Naruto and Naruto manga are for sale in area 205. In the example shown in FIG. 1H, the photos of the merchandises are shown next to the brief descriptions of the merchandises.

In addition, on page 190, there could be an area 206 of sponsored links for paying merchants or advertisers to place ads with links to web sites that offers products and/or services. In one embodiment, the products and services displayed in the area 206 are related to photo 193 or to other subjects of cosplay. In the example shown in FIG. 1H, Naruto toys, and Naruto Action Figures are for sale.

Going back to FIG. 1F, page 150 can also include an area 159 for featured photos, which are selected from all photos in the site. In one embodiment, the featured photos are all centered on a theme or subject, such as Uzumaki Naruto, Sailor Moon, Star Wars™, etc. The theme or subject can be chosen based on popularity, by an administrator of the site, or by a selected user (for example, someone who is an active user of the site). Alternatively, the featured photos can be selected based on popularity and recency (newness), which means the newness of the photo. In one embodiment, the featured photos in area 159 are selected from all photos of the site based on an algorithm and are selected automatically based on the algorithm. This automatic selection allows the site to be maintained with no or minimal human intervention. In the example shown in FIG. 1F, area 159 is divided into 4 sections, where 4 photos are placed in the 4 sections.

In one embodiment, page 150 of FIG. 1F can also include an area 160 for featured video, which are selected from all videos. Similar to featured photos, the featured videos can be selected by human or can be automatically selected based on an algorithm established by the administrator(s) or builder(s) of the site. Again, automatic selection of featured videos allows the site to be maintained with no or minimal human intervention.

In one embodiment, page 150 can also include an area 161 for "Latest comments" by users. In this area, latest comments from users are posted. For example, a comment by User-O is posted in area 162 within area 161. The user who makes the comment, what the comment is for and when the comment was made are listed in area 162.

At the bottom of page 150, there could be areas of different subjects. For example, area 163 is for cosplay. A number of links to coplay animes are listed, such as "Anime 1", and "Anime 2." A user can click on the title and be presented with a page full of information, photos, videos, discussions and comments related to a cosplay anime (or animation), such as "Anime 1" or "Anime 2." Similar to area 163, area 164 is for Cosplay games, area 165 is for cosplay discussion boards inside and external to the site, and area 166 is for cosplay blogs inside and external to the site. When a user click on one of the link, information related to the link would be presented in a web page.

In one embodiment, below the popular photos and popular videos, there can be an area 167 for cosplay costumes. As mentioned above, costumes are very important for cosplayers, who often like to check out costumes they are interested in and costumes worn by other cosplayers. Users of the site can click on one of the boxes in area 167 to view photo of a particular cosplay costume. In addition, there could be an area 168 for photos or avatars of cosplayers. Further, there could be an area 169 for event calendar for cosplay. In the example shown in FIG. 1F, the event calendars of 2007, 2008, and 2009 can be accessed. For example, users can click on the 2008 box to access calendar with 20088 events. However, other ways of presenting event calendars are also possible.

The description above shows how a Worlds site looks like. The building and maintaining of such a site would be described below.

As described above, creating and maintaining an entertainment-based web site, such as the Cosplay site, are very time and money consuming. The interests and taste of online users change very rapidly; therefore, it is desirable to have an automatic system and method to create and to maintain such a site to keep the content fresh and relevant. The content can be refreshed by new content from the Internet and can be added by users of the site. In addition, active users can perform the function of moderators or administrators of some sections or areas of the site. For example, as discussed in FIG. 1F, active users can be awarded with privilege to determine key article in area 151, featured photos in area 159, and featured videos in area 160. Alternatively, key article in area 151, featured photos in area 159, and featured videos in area 160 can be determined (or chosen) based on popularity and recency. If the site is constructed by an automated system and method, and is designed to be maintained by algorithms with the assistance of site users, minimal administration from a non-user administrator(s) is required. Further, the vast content of the Internet, which are updated regularly, and content contributed by users of the site can be utilized to keep the site relevant and updated to users of the site.

Figure 2A:
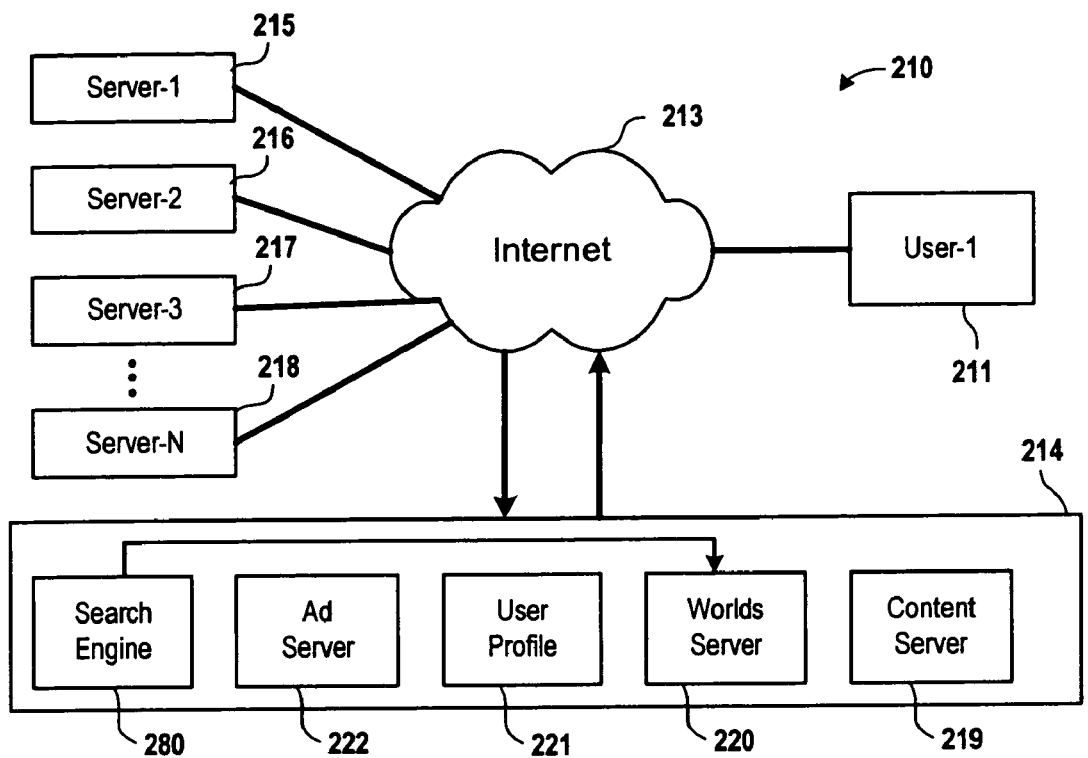
FIG. 2A shows a system for automatically creating a Worlds web site, in accordance with one embodiment of the present invention.

FIG. 2A shows a system 210 for automatically creating a Worlds web site, in accordance with one embodiment of the present invention. Although the description of system 210 is focused on creating a Worlds web site, the concept of the system can be used to create other types of web sites with subjects interesting to online users. System 210 includes a client system 211 for User-1, Internet 213, and a portal site 214, such as Yahoo!. User-1 utilizes the client system 211 to interact with the system 214 of the portal site through Internet 213.

For example, User-1 can access entry pages, such as page 100, 120, 130, 140, 150, and 170, 190, and/or other pages that are offered by the portal site 214. The portal site 214 has a number of servers. The portal site 214 includes a search engine server 280, which indexes the content in the Internet and provide search results to users who utilizes the search engine of the portal site 214. In one embodiment, the search engine server 280 is configured to collect search data of Internet users' search activities with the portal site 214. The collected data could include, but not limited to, time of search, search keywords, sites with information related to the search keywords, and user identification, etc. In another embodiment, the search engine server 280 is further configured to analyze the collected search data to identify popular search keywords (or terms) over a period of time most recently. These identified popular search keywords can be seen as emerging trends. The emerging trends can be determined based on the total number of searches based on the keywords passing a per-determined threshold or passing a rate of increase in searches passing another pre-determined threshold. The search engine server 280 is further configured to provide search keywords (or terms) that are related to popular search keywords, or any keyword. The related search keywords can be ranked based on the number of searches conducted using the keywords (i.e. based on popularity). Alternatively, other methods can be used to rank related search keywords for popular keywords. In one embodiment, the search engine server 280 is configured to provide addresses of sites that have content related to search keywords. The search engine server 180 is further configured to provide ranking of web sites with the relevant content to the search keywords in terms of relevancy and/or amount of data. For example, for the search keyword of "cosplay", the search engine server 280 can provide information of a list of sites that have content relevant to "cosplay" and can further rank the list from most relevant to least relevant according to a ranking algorithm. The algorithm can be based on matching of the keyword "cosplay" and/or the amount of content related to "cosplay", etc.

Web sites can be created based on identified popular search keywords (or emerging trends) with related search keywords to meet the demands of Internet users of knowing more about the emerging trends, to attract users to the web sites, and to potentially earn advertising revenue by users' viewing of advertisements on the sites.

The portal site 214 also include servers, such as a content server 219, which prepares content of pages, such as page 100, and a Worlds server 220, which prepares content of pages, such as pages 120, 130, 140, 150, 170, and 190, of a Worlds web site. In one embodiment, the Worlds web site is a site within the portal site 214. Alternatively, the Worlds web site can reside outside the portal site 214. System 210 also includes a user profile server 221, which stores users' cookies and background information. The information in the user profile server 221 helps identify users and allows the content server 219 and the Worlds server 220 to provide content relevant to users, such as User-1. Further, system 210 has an ad server 222, which provides ads to content server 219 and Worlds server 220 to appear in web pages for users, such as User-1. Alternatively, there could be more than one Worlds server, which are similar to Worlds server 220, to prepare content for other Worlds sites.

Worlds server 220 takes information from various servers, such as Server-1 215, Server-2 216, Server-3 217, and Server-N 218, connected to the Internet 213. The various servers can be any server on the Internet 213, as long as it provides information relevant to the Worlds web site created by Worlds server 220. Examples of servers that can provide information relevant to Worlds server 220 include, but not limited to, photo servers, such as Flickr, video servers, such as YouTube, music servers, and cosplay merchandise site, etc.

When the subject (or theme) of the web site is determined, the design (or layout) of the web site should also be determine. For example, what types of information, such as photos, videos, music, etc., and what types of functionalities, such as discussion boards, blogs, user comments, etc., the site would offer. In one embodiment, the design (layout) of the site determines the components of the storages and databases in the Worlds server 220. For example, if the layout of the site includes photos shown to users, then the Worlds server 220 for the site would have a photo storage.

Figure 2B:
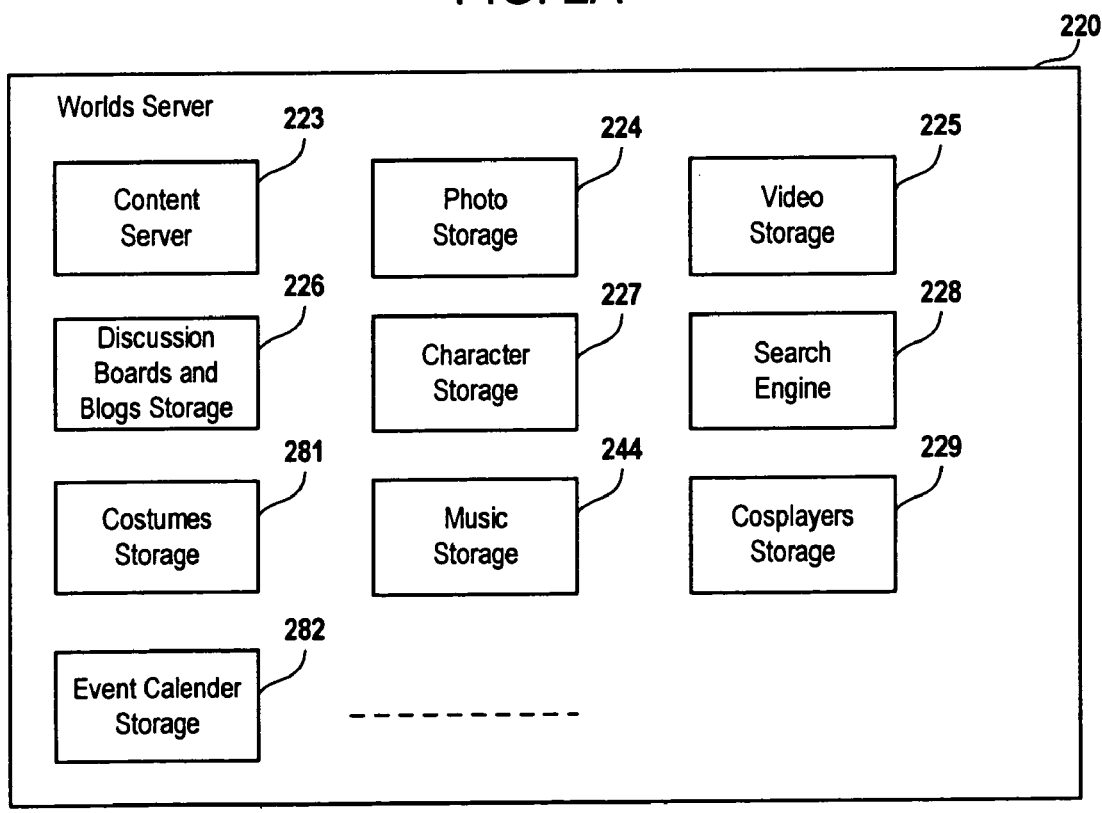
FIG. 2B shows the components in a Worlds server, in accordance with one embodiment of the present invention.

FIG. 2B shows the components in the Worlds server 220, in accordance with one embodiment of the present invention. Worlds server 220 includes a search engine 228, which allows the World servers to index content of web sites, such as Server-1 215, Server-2 216, Server-3, 217, and Server-N 214, connected to the Internet. The search engine 228 identifies content available on the Internet that are relevant to web site created in the Worlds server 220. Worlds server 220 also includes a content server 223, which generates web pages with content for users of the Worlds web site, such as "The World of Cosplay" site. In one embodiment, Worlds server 220 has one ore more photo storages, such as photo storage 224, which store photos related to the subjects (or themes) of the Worlds web sites, for example "Cosplay." The portal, such as Yahoo!, likely has a number of Worlds web sites under different themes (or subjects). As mentioned above, alternatively content of different Worlds sites can reside on different servers. The photos for different Worlds web sites can be in the same photo storage (such as photo storage 224), where the databases in the storage organizes the photos for different Worlds web sites accordingly, or in different photos storages, where each storage holds photos for a particular Worlds web site.

Similar to photo storage 224, the Worlds server 220 also has one or more storages for video, such as video storage 225, which store videos for Worlds web sites. Similar to the photo storage 224, the videos for different Worlds web sites can be in the same video storage (such as video storage 225), where the databases in the storage organizes the videos for different Worlds web sites accordingly, or in different videos storages, where each storage holds videos for a particular Worlds web site. Further, the Worlds server 220 can have one or more storages for discussion boards and blogs, such as discussion boards and blogs storage 226, which store discussion threads of various discussion boards and blogs. In addition, the Worlds server 220 can have one or more storages for main characters in cosplay, such as character storage 227, which stores descriptions and information of known characters of cosplay. For example, description and information related to Uzumaki Naruto can be stored in the character storage 227. The character storage 227 can be renamed with other appropriate terms, such as key cosplay character storage, etc. Other terms may be used for other Worlds sites. For example, a Worlds site for a particular college basketball team would have a key player storage 227 that stores information or description about key players of the team for different years. Other types of information, such as music, comments, etc., can also be stored in various storages, such as music storage 244, cosplayers storage 229, costumes storage 281, and event calendar storage 282 in the Worlds server 220. The cosplayers storage 229 can store information about the members of the Cosplay web site. Videos, photos and/or avatars of the members (or cosplayers) can be stored here or in video storage 225 or photo storage 224. The costumes storage 281 can store information about cosplay costumes, which can be from other Internet sites or can be uploaded by members of the site. Photos of costumes can be stored here or in photo storage 224. The event calendar storage 282 can store information about cosplay parties and events, such as date, time, theme, and descriptions, etc. In one embodiment, the Worlds server 220 includes a music storage 244, which stores music files relevant to the site. Alternatively, different types of media, such as text, data, pictures, sound (including music), and video, etc., can be stored in a multimedia storage. The multimedia storage can be used to replace any of the storages mentioned above and be added to system 220.

The search engine 228 identifies content related to the subject (or theme), which is chosen based on search popularity or popularity rate, and related search keywords from Internet to place them into different storages, such as storages 224, 225, 226, 227, 229, 244, 281, and 282 of Worlds server 220. The placement of different types of files in different storages is according to file types. For example, well known photo file formats include, but not limited to, JPEG (Joint Photographic Experts Group), TIFF (Tagged Image File Format), GIF (Graphics Interchange Format), SVG (Scalable Vector Graphics), etc. Similarly, videos and music pieces also have their own file formats. The system can be set up to place files into different storages according to their formats and/or sources of file. For example, files from YouTube.com are most likely to be videos and they are placed in video storage(s). In another embodiment, text-based content (or information, or files) found on Internet sites can be organized according to the types of the information to be placed in different storages. For example, character description of Uzumaki Naruto can be identified and determined by the search engine 228 to be placed in the character storage 227. Some storages, such as discussion boards and blogs storage 226, might not be populated with content from Internet. Instead, these storages, such as discussion and blog storage 226, are populated by content created by users of the site. For example, users choose topics for the discussion boards and blogs after the site is launched.

The content server 223 interact with various storages, such as storages 224, 225, 226, 227, 229, 281, and 282, in the Worlds server 220 to prepare web pages, such as pages 150, 170, and 190 discussed above, requested by users, such as User-1.

As discussed above, information that is interesting to users changes rapidly. It's very expansive to set up and maintain a site by dedicated personnel. Therefore, it's desirable to have an automated system and method to set up and maintain the Worlds site. The system is discussed above in FIGS. 2A and 2B. To set up the Worlds site, such as "The World of Cosplay" site (or the "Cosplay" site), the data analysis of search results of search engine 280 identifies a search keyword, which can be a word or a phrase, that has become very popular (emerging trend) to justify creating a web site for the emerging trend (or concept, or subject). As mentioned above, the criteria of creating a web site for the emerging subject can be based on passing a threshold of searches over a period of time. For example, 1 million people searches the keyword in the last year. Alternatively, the criteria could be the rate of increase in searches of the keyword has passed a threshold over a period of time. For example, the rate of increase in search is 10,000 more searches every month for the past 6 months. The examples here are only used to illustrate and the numbers quoted are not based on real situation.

The data analysis also identifies a number of search keywords related to the emerging subject. The number of search keywords related to the emerging subject is placed in order based on their relevancy. As shown in the example in FIG. 1B, search keywords that are related to "cosplay" includes "naruto cosplay," "cosplay costumes," "anime cosplay," and "death note cosplay," etc. These related search keywords are identified based on analysis of search activities of Yahoo! search engine. They are most popular search keywords that are related to "cosplay," and their orders reflect their relevancy to the search keyword "cosplay." In the example here, "naruto cosplay" is more relevant than "cosplay costumes" to "cosplay" and so on. The relevancy ordering is based on analysis of search results of the search engine, such as search engine 280. As mentioned above, the data analysis of search activities of a search engine, such as Yahoo! search engine or search engine 280, can provide addresses, uniform resource locators (URLs) of sites that have information related to "cosplay." For example, "cosplay.com", "YouTube.com", and "Flickr.com" all have a lot of information related to cosplay.

Figures 2C, 2D:
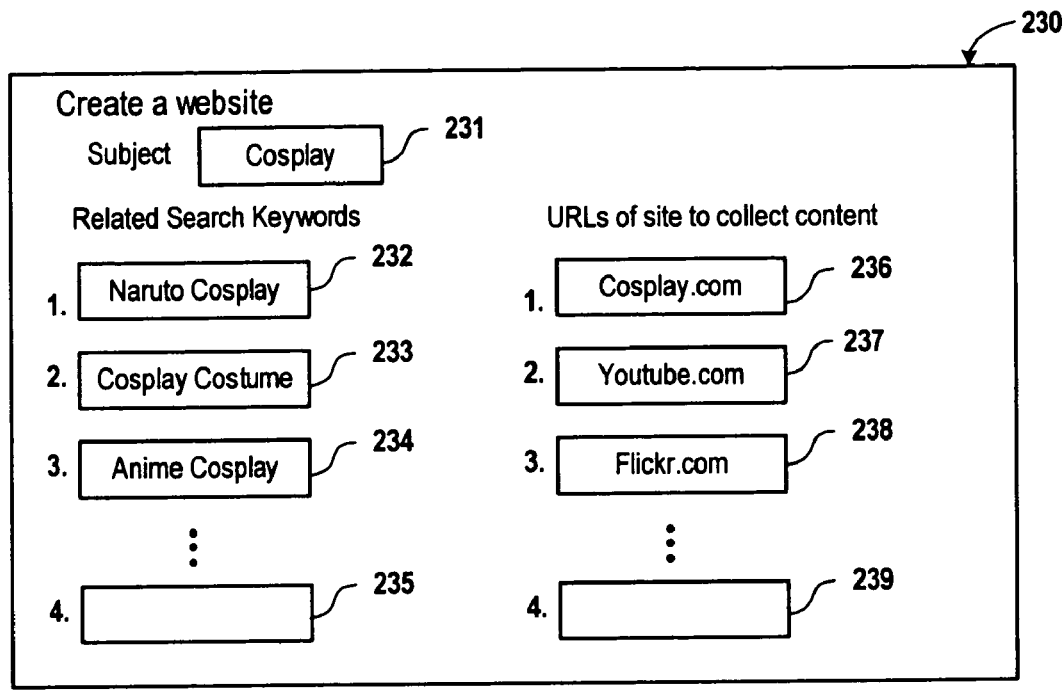
FIG. 2C shows a site creation information sheet listing information needed to create a cosplay site, in accordance with one embodiment of the present invention.
FIG. 2D shows a photo database in the photo storage of FIG. 2B, in accordance with one embodiment of the present invention.

The information from the data analysis of the search activities can be used populate a site creation information 230 in FIG. 2C that can be used to create a web site based on the emerging subject (or trend), in accordance with one embodiment of the present invention.

The site creation information 230 shows the information needed from the search analysis to create a cosplay site. The information includes the subject 231 of the site, a number (1, 2 . . . ,M) of related search keywords, and a number (1, 2, . . . , O) of URLs of sites to collect content for the cosplay site. In the example shown in FIG. 2C, boxes 232, 234, and 235 contain information of top related search keywords. FIG. 2C also shows that boxes 236, 237, 238, and 239 contain information of top sites to search for content to populate the site. The results from the data analysis of search activities can automatically be fed to generate the site creation information 230 without human intervention. Human intervention might be needed in determining the number M of related search keywords and the number O of URLs. The number (M) of boxes to enter search keywords, which can be words or phrases, can be as low as 1 and as high as possible, such as 100 or more. An example of number for M is 20. Other numbers, such as 30, or 40, are also possible. The number for M depends on the amount of time and hardware allocated for processing the feeds. With higher number of M, more time and more hardware are needed for processing the data related to the search keywords. The number (O) of boxes to enter web sites for searching relevant content can be as low as 1 and as high as possible, such as 100. An example of number for 0 is 20. Other numbers, such as 30, or 40, are also possible. The number for O depends on the amount of time and hardware allocated for processing the feeds. With higher number of O, more time and more hardware are needed for processing the data on higher number of web sites.

Once the site creation information 230 is generated, creation of the site can be started. The Worlds server 220 would start collecting content from the web sites identified. The "Cosplay" web site can be created and be populated with the content retrieved from the web sites identified. Alternatively, the content search can happen first is and the layout plan can be selected after initial content searched is performed.

After the web site is created and launched, and users start to use the site, users can contribute content to the site by participating in the discussion boards and blogs. In addition, users can also upload files, such as photo files and videos files, to the site to share with other users. Users can also help "tag" the content of the web site to make content of the site more searchable. For example, a user who sees an "Uzumaki Naruto" picture could add the tag "Shippuden" to indicate that the costume of the character is from the Shippuden series. This allows the picture to be searched under the term "shippuden," which was missed by the original tagging of the photo. With the participation of users, the content of the web site can increase rapidly and be continuously updated. Users' participation is very important for such a site. Users' knowledge of content in the site can help the site be more interesting, updated, and more searchable.

In one embodiment, users' activities affect information displayed in the site. As discussed above, the most popular site content, such as photos, videos, and discussion boards, are highlighted in more prominent places on the web pages of the web site. For example, the lead article in area 151, featured photos in area 159, and featured videos in area 160 can be selected by users who are most active on the site, i.e. by users who make a lot of comments, upload many photos and videos, etc. Of course, the lead article in area 151, featured photos in area 159, and featured videos in area 160 can also be selected based on other algorithms. Another example is the latest comment by users in area 161 of FIG. 1. Showing users' inputs, comments, and activities and allowing users' activities and involvement in the site to affect site content would encourage users to be more involved in the site, would increase traffic to the site and would make users more loyal to the site.

The photos, videos, and other types of information that are found relevant to the main subject of "cosplay" can be downloaded to the Cosplay site described here and be placed in the various storages, such as storages 224, 225, 226, 227, 229, 281, and 282 described above. Of course, content is only downloaded only legally and/or with approval. In addition, the content of the site, such as photos, videos, etc., that are entered and/or uploaded by the users are also stored in the various storages, such as storages 224, 225, 226, 227, 229, 281, and 282, described above. The content contributed by the users become content of the site and can be viewed and commented by all users of the site. The content contributed by the users become content of the site and can be viewed and commented by all users of the site.

As mentioned above, web pages of the web site, such as pages 150, 170, and 190, have search boxes that allow users to search for content in the web site. The search engine 228 of Worlds server 228 also indexes content of "The World of Cosplay" web site created by and in the Worlds server 220. The search index created by the search engine 228 allows users of the site to search for content on the web sites. Searching for content with text, such as description of characters, discussion boards, and blogs, is relatively straightforward, since the text of the content is seachable. When users enter keywords, content with text that contains the keywords would be identified. However, non-text-based content of the site, such as photos, videos, and music, etc., need to be tagged with words or phrases to allow (or enable) searching. The tags for non-text-based files, such as photos, videos and music pieces, can come from the sources of these files. For example, photos at Flickr.com are often tagged. Many web sites that store non-text-based files, such as photos, videos, and music, set up their systems to allow users to tag the files. For example, the tags can be entered by the people who upload the photo files to Flickr.com. Alternatively, titles and description of non-text-based files, such as photos, videos, and music pieces, etc., are text-based and can be considered as tags too. The original tags can be imported along with the photo files and be downloaded to the photo storage(s) 224 in the Worlds server 220 along with the photos. These user tags are also very valuable and can be stored to enable searching of the non-text-based files.

FIG. 2D shows a photo database 250 in the photo storage 224 of FIG. 2B, in accordance with one embodiment of the present invention. Photo database 250 stores photo files, which can be downloaded from the Internet or uploaded by users of the Cosplay site. Photo database 250 has an identification (ID) column 251, which stores IDs of photo files, a description column 254, which stores a brief description of the photo file, a tag column 255, which stores tags related to the photo files, and a photo file column 256, which stores the photo files. In one embodiment, each ID in the ID column 251 is made up of two sets of identifications, source ID 252 and photo ID 253. Source ID 252 indicates the source of the photo file. For example, if the photo file, such as photofile1 257, is downloaded from a site, such as Flickr.com. The source ID 252 is an ID, which is "xxxxx" in the current example, assigned by the Cosplay site to Flickr.com. Yahoo! can assign a unique ID to each external site (or source site). If the photo is uploaded by a user, the unique ID of the user, which is given by Yahoo!, can be used. The photo ID 253 is an ID associated with the photo file 257. In one embodiment, the photo ID is taken from the source site, such as Flickr.com. Normally, each photo file has an ID assigned. If an ID is not associated with a photo file, a title and/or a post-date can be used to identify the photo. If the photo file is uploaded by a user, Yahoo! can assign an ID to the photo file.

In the current example, the photo ID of photo file 257 is "yyyyy." The source ID 252 and photo ID 253 can be made up of numbers, alphabets, or a combination of both. The combined source ID 252 and photo ID 253 of each photo file makes a unique ID for the photo file. The unique ID of each photo file allows the photo file to be uniquely identified. When the search engine of Cosplay site performs searches of photo files in the identified sites, even if the photo IDs of two different photo files from two different sites are the same, the IDs of these two photos would be different due to different source IDs assigned to different sites.

The description column 254 stores description of the photo file. For example, the description of photo file 257 is "Uzumaki Naruto". In addition, the tags for photo file 257 are "Uzumaki Naruto," and "Shippuden" Table 250 is filled with various photo files with corresponding IDs, descriptions, tags, and photo files.

Similar to a photo database 250, the video storage 225 can also has video databases organized in a manner similar to the photo database 250. The video files in the video database can also have unique IDs based on a combination of source IDs and video IDs. Any content files that are downloaded can be stored in the manner described above for FIG. 2D. Unique IDs of the downloaded files also allow the downloaded files to be uniquely stored in the databases and to avoid downloading a file multiple times. For example, search engine 228 indexes the web sites for content continuously. A photo file that has been indexed and downloaded would not be downloaded again, since the unique ID of photo file is stored in the database. Before the server 220 downloads a file, server 220 would check the ID of the file with IDs of files stored in the system. If the ID already exists in the system, server 220 would not download the file again.

The tags associated with photos, videos, music, and other types of files stored on the Cosplay site allow these non-text-based files to be searchable by users of the site. Text-based files can also be tagged. Tagging of text-based files can also assist searching. Usually, the tags of text-based files are given higher weights than the text in the text-based files. As mentioned above in box 182 of FIG. 1H, tags can also be added by users of the current Cosplay site. To avoid some users abusing the tagging function to enter offensive tags and/or incorrect tags, the system can be set up with algorithms to allow some users with good track records (or approved users) with unlimited tagging capability, while allowing new users and/or un-proven users limited tagging capability. For example, the tagging by un-proven users is only approved when more than one users tag the item with the same terms. The tagged terms can also be first checked to screen out offensive terms by a checking tool.

Figure 2E:
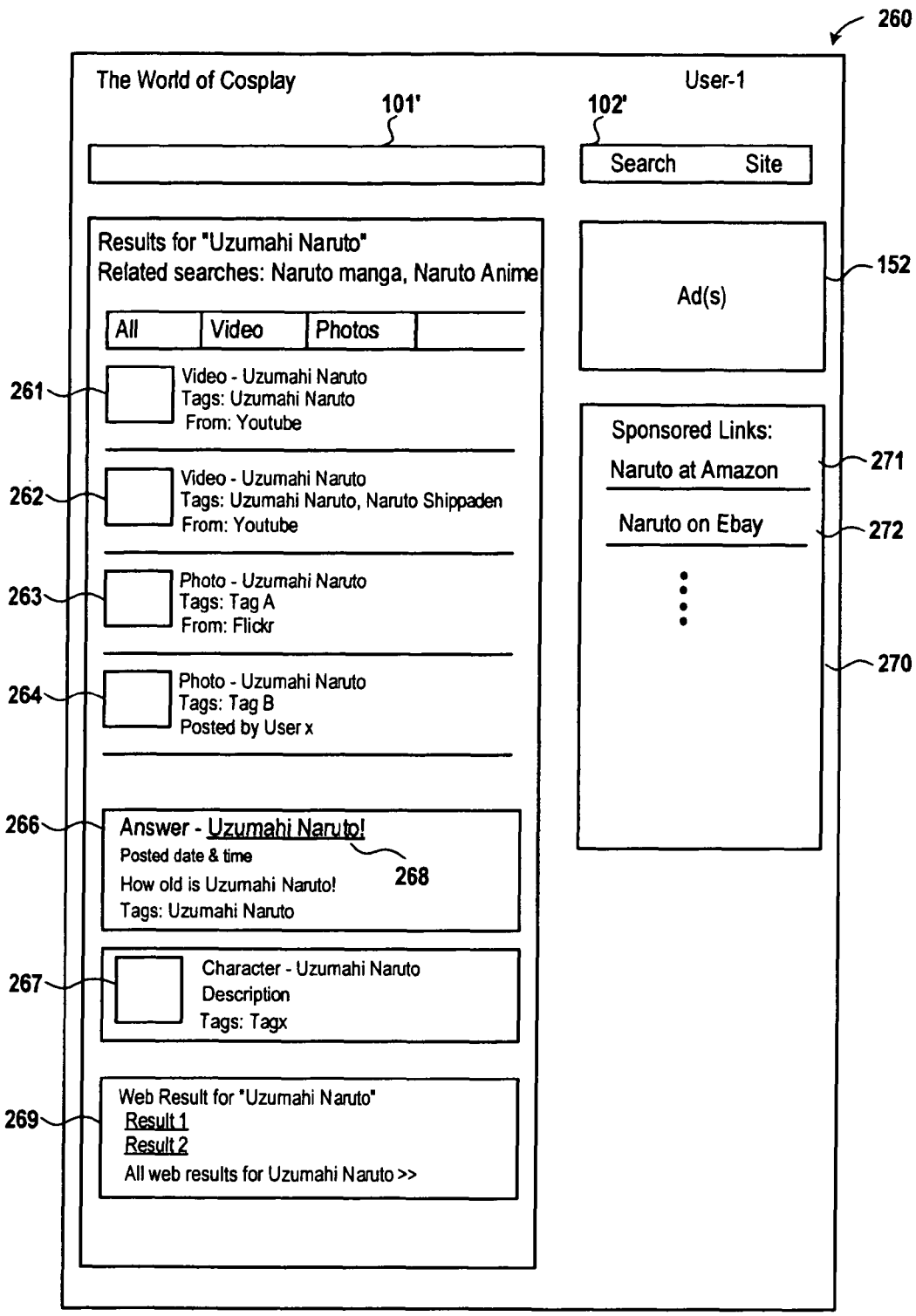
FIG. 2E shows a search result page for the search term "Uzumaki Naruto," in accordance with one embodiment of the present invention.

FIG. 2E shows a search result page 260 for the search term "Uzumaki Naruto," in accordance with one embodiment of the present invention. Page 260 is returned when a user, such as User-1, enters the term "Uzumaki Naruto" in the search box 101' of FIGS. 1F, 1G, or 1H. The result page 260 contains a number of results that include video(s), photo(s), and character tagged with the term "Uzumaki Naruto", and text containing the term "Uzumaki Naruto." In the example shown in the result page 260, the search results include two videos 261, 262, two photos 263, 264, an answer 266 to a question related to "Uzumaki Naruto", and a character description 267 of the character "Uzumaki Naruto" in Naruto series. Each video (261 or 262) contains tags and source of the video. For example, video 261 is tagged with the term "Uzumaki Naruto", while video 262 is tagged with terms including "Uzumaki Naruto", and "Naruto Shippuden," etc. Videos 261 and 262 are both from "YouTube.com." Similar to videos, photos 263, and 264, are also tagged and the sources of the photos are also listed. In one embodiment, brief descriptions (not shown) for videos (261, 262), and photos (263, 264) are included.

The answer 266 has a link 268, which can be clicked to display the full question and answers for the question. The answer 226 is listed in the search result because the question for the answer 266 is related to "Uzumaki Naruto." In the example shown in FIG. 2E, the latest posting date and time for an answer to the question in answer 266 is listed. Below the posting date and time, the question of "How old is Uzumaki Naruto?" is listed. Below the question, the tag(s) for the answer 266 is listed to be "Uzumaki." The character description 267 includes the character name "Uzumaki Naruto," and a description of character "Uzmumaki Naruto." The tags for the character are also included.

Below the research results, there are additional pages, such as 2, 3, 4, 5, next, previous, first, and last, containing search results of "Uzumaki Naruto". In one embodiment, at the bottom of the result page 260, an area 269 with a list of search results related to "Uzumaki Naruto" found from the Internet (or Web) is included. For fans that are enthusiastic about "cosplay," the searching capability on the cosplay site allows them to find the things, such as photos, videos, discussions, etc., related to cosplay. On the right side of page 260, there could be an ad area 152 and an area 270 listing sponsored links related to the search term "Uzumaki Naruto." In area 270 of FIG. 2E, an exemplary link 271 with "Uzumaki Naruto at Amazon," and an exemplary link 272 with "Uzumaki Naruto at ebay" are shown. Site owner of "The World of Cosplay," such as Yahoo!, can make financial gains from the ads and sponsored links displayed in area 152 and area 271. Advertisers often pay to display sponsored links (or results) based on matching keywords, which can be words or phrases.

Figure 3:
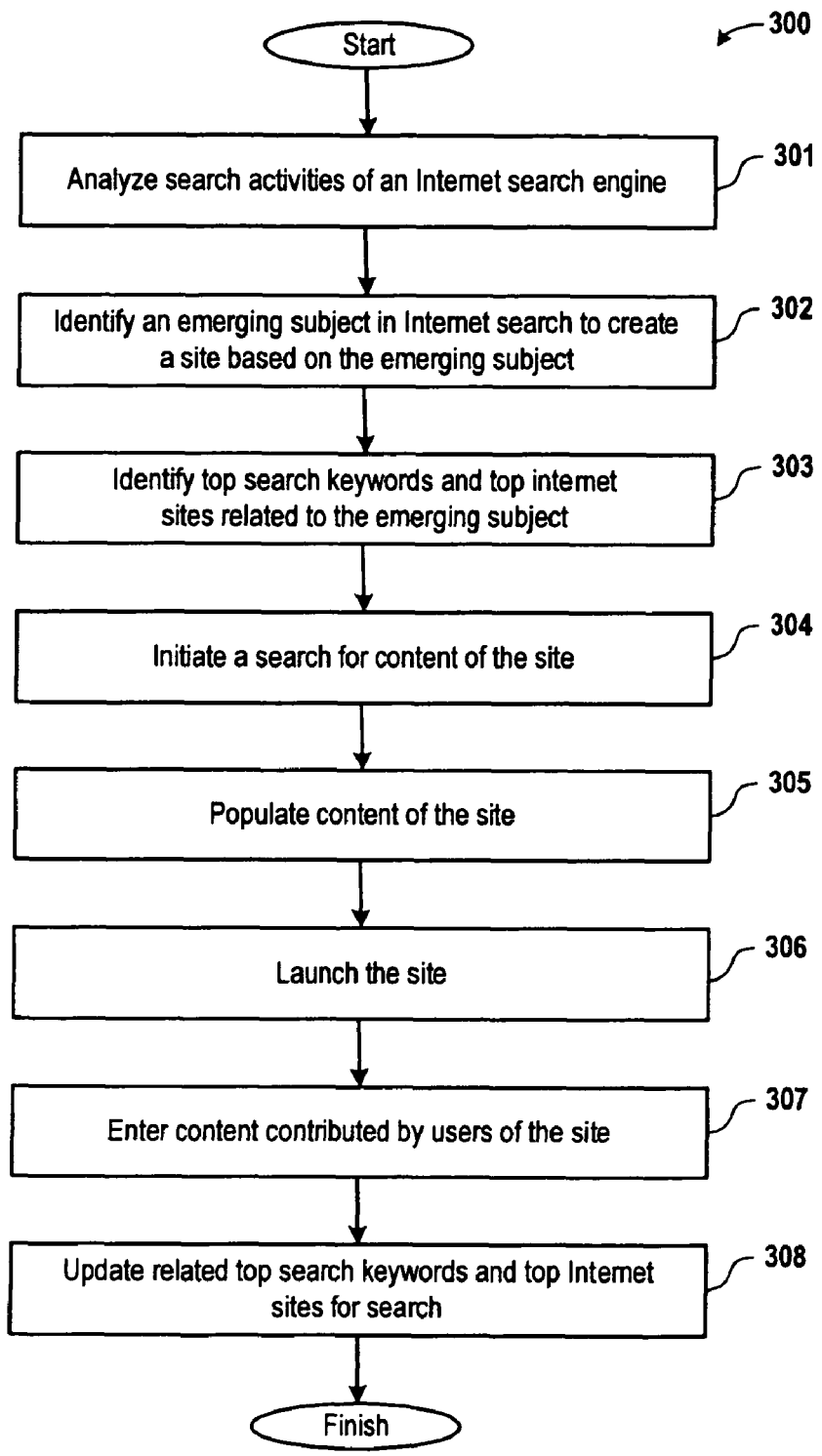
FIG. 3 shows a process flow for automatically creating a site based on an emerging subject in Internet search, in accordance with one embodiment of the present invention.

FIG. 3 shows a process flow 300 for automatically creating a site, such as the Cosplay site discussed above, in accordance with one embodiment of the present invention. At operation 301, the search activities (or data) of an Internet search engine, such as Yahoo! search engine, is analyzed. At operation 302, an emerging subject in the Internet search is identified. As discussed above, identifying the emerging subject can be based on the search subject (or keyword) passing a defined threshold. At operation 303, a list of top search keywords related to the emerging subject and a list of top Internet sites related to the emerging subject are identified. The list of top Internet sites have content most relevant to the emerging subject and will be searched for content related to the emerging subject and related top search keywords. At operation 304, a search for content for the site of the emerging subject is initiated. At step 305, the content collected from these selected sites on the Internet are used to populate the databases of the site (or populate the content of the site). After the databases of the site are sufficient populated, at operation 306, the new site is launched and becomes accessible by Internet users. Once users start to use the site, users would contribute content to the site by uploading files, joining discussion, and entering texts in blogs. At operation 307, the content contributed by users are entered by the system to update content in the site. At the same time the users are adding content to the site, the search engine for the site continues to search for new content available on the Internet. The administrator can update related search keywords and related top Internet sites for content for the site. For example, the data analysis of the Internet search engine might identify new related top search keywords and related top Internet sites. At an optional operation 309, the related search keywords and related Internet sites identified in operation 303 are updated by the administrator This step is optional because the administrator does not need to update the search terms and search sites. The process can be done automatically. The results of the analysis of search activities of the Internet search engine can be fed directly to the server of the site. In this embodiment, the related search keywords and related Internet sites to search for content for the site are continuously updated without the intervention of an administrator.

The web site created is supposed be maintained with minimal resources, such as by system administrators. The home page of the web site, such as page 150 of FIG. 1F, is designed to present information that is most updated and most popular to users. In the beginning of constructing of the web site, when no or few users have accessed the web site, the administrator can select the lead article in area 151, a few videos in area 159, and photos in area 160 of page 150. Alternatively, the system can be set up to populate these fields in the beginning by an algorithm, such as placing most updated article, videos, and photos in these fields. In another embodiment, these fields can be populated by article, videos, and photos that are most popular to the Internet users. The popularities of articles, videos, photos, and other types of files available on the Internet are usually known. Once the site has been used by users, users of the site can have more influence to the content in these fields. For example, these fields, 151, 159, and 160, can be populated by articles, videos, and photos, respectively, based on recency (newness) and popularity of the users of the site. Recency of a file reflects how new the file is. Users can be more interested in latest data. Alternatively, active contributors or users of the site can be enlisted to administer the site. For example, the most active contributor(s) can be enlisted to select lead article, feature photos, or feature videos, etc.

Similarly, the "latest comments" field 160 can be populated based on recency, since field 160 displays "latest" comments. The various fields and areas on web pages of the site can be populated by content based on algorithms set up by the system creator(s), or system administrators). The system administrator can always interview to take down inappropriate content or to remove offensive users. The site can include features to allow users to report inappropriate users or inappropriate user activities on the site. However, the goal is to have the site almost automatically run with limited involvement of paid personnel. Users' contribution of content and interaction with the site keep the content of the web site updated, fresh and interesting. The site is "alive" with users' inputs. In addition, the search engine for the site continues to search for content from the relevant web sites on the Internet to keep the content of the site fresh and updated.

Such a site that is created by an automatic system and method reduces the time and money needed to create and maintain the site. In addition, using the fresh content available on the Internet, content contributed by the users, and inputs (such as discussion, tagging, etc.) from the users, the site can capture information that is most relevant and interesting to the users.

Although the exemplary web site ("The World of Cosplay" site) discussed above resides in a portal (Yahoo!), web sites created and maintained in the manner described above does not need to be part of a portal. Web sites created and maintained in the manner above can be independent sites.

Embodiments of the present invention provide automatic systems and methods for creating a web site based on an emerging subject, which is also a search keyword, by analyzing search activities (or data) of Internet users of a popular Internet search engine. Analysis of search activity data of the Internet search engine can also provide search keywords that are most related to the emerging subject, and Internet sites with content relevant to the emerging subject. As discussed above, creating and maintaining a web site with updated content can be very time and resource consuming. Therefore, it is desirable to create and maintain such a site with an automatic system and method using information available on the Internet. To create such a web site that is of interests to Internet users, the emerging subject and related search keywords mentioned above can be searched on Internet sites identified to have content relevant to the emerging subject. The search results are used to populate databases for this web site. After the web site is created and launched, users of the site can contribute to the content of the site. User contribution of additional content to a web site keeps the web site updated and interesting to all users of the site. Further, searching on Internet sites is configured to continuously add content that is new and relevant to the web site. In addition, active users of the web site can engage in basic administration of the site, which reduces the need of intervention by paid administrators. Thus, by obtaining content from Internet sites, coupled with contributions made by users, it is possible to automatically create and maintain new custom created sites with minimal intervention by paid administrators.

With the above embodiments in mind, it should be understood that the invention might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data, which can be thereafter read by a computer system. The computer readable medium may also include an electromagnetic carrier wave in which the computer code is embodied. Examples of the computer readable medium include hard drives, network lo attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The above-described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for automatically creating a web site based on an emerging subject of Internet search, comprising:
   analyzing search data of an Internet search engine to identify the emerging subject in Internet search to create the web site based on the emerging subject, the emerging subject identified when a number of searches having terms related to the emerging subject passes a threshold over a period of time;
   analyzing the search data of the Internet search engine to identify search keywords that are most relevant to the emerging subject and to identify Internet sites that have content most relevant to the emerging subject;
   initiating a search for content for the web site via a search engine based on the identified search keywords on the identified Internet sites; and
   automatically creating the web site based on the emerging subject, wherein at least a portion of the content of the web site is obtained from search results of the search initiated, wherein the web site is made accessible to users.

2. The method of claim 1, wherein passing the threshold over the period of time further includes detecting rate of increase in the number of searches having terms related to the emerging subject.

3. The method of claim 1, further comprising:
   receiving additional content for the web site contributed by the users of the web site, wherein the additional content is entered or uploaded by the users of the web site, and wherein the additional content entered or uploaded by the users maintain the content of the web site current.

4. The method of claim 1, wherein the content of the web site includes one or more of photos, music, videos, user comments, discussion boards or blogs.

5. The method of claim 1, further comprising:
   identifying updated search keywords that are most relevant to the emerging subject and updated Internet sites to search for content after the web site is automatically created.

6. The method of claim 1, wherein the identified search keywords and the identified Internet sites are continuously updated.

7. The method of claim 1, wherein the content of the web site that is more popular with the users of the web site is displayed in a more prominent location of the web site.

8. The method of claim 3, wherein at least one user of the web site administers a portion of the content of the web site.

9. The method of claim 8, wherein the web site is automatically run with minimal assistance of external administrators due to content of the web site being from the search results, being entered or uploaded by the users of the web site, and being administered by the least one user of the web site.

10. The method of claim 1, wherein non-text-based content of the web site are tagged to enable searching within the web site.

11. The method of claim 10, where the tags of the non-text-based content of the web site from the search results are inherited from sources of the non-text-based content.

12. The method of claim 1, wherein each piece of non-text-based content of the web site that is obtained from the search results has a unique identification made of an identification given by the source of the piece of the non-text-based content and an identification describing the source of the piece of the non-text-based content.

13. A method for automatically creating a web site based on an emerging subject of Internet search, comprising:
    analyzing search data of an Internet search engine to identify the emerging subject in Internet search to create the web site based on the emerging subject, the emerging subject identified when a number of searches having terms related to the emerging subject passes a threshold over a period of time;
    analyzing the search data of the Internet search engine to identify search keywords that are most relevant to the emerging subject and to identify Internet sites that have content most relevant to the emerging subject;
    initiating a search for content for the web site via a search engine based on the identified search keywords on the identified Internet sites; and
    automatically creating the web site based on the emerging subject, wherein at least a portion of the content of the web site is obtained from search results of the search initiated, wherein non-text-based content of the web site can be tagged by users of the web site to assist searching of the non-text-based content.

14. The method of claim 13, further comprising:
    receiving additional content for the web site contributed by the users of the web site, wherein the additional content is entered or uploaded by the users of the web site, and wherein the additional content entered or uploaded by the users maintain the content of the web site current.

15. A system for automatically creating a web site based on an emerging subject of Internet search, comprising:
    a multimedia storage for saving media files related to the subject of the web site;
    a member storage for saving information related to members of the web site;
    a search engine configured to search a plurality of web sites for content related to a plurality of search keywords related to the subject of the web site, and wherein search results of the search engine populate the photo storage, and the video storage to automatically create the web site; and a content server configured to prepare web pages of the web site in responses to requests from users of the web site, wherein the photo storage, the video storage, and the member storage provide content for the web site, and wherein the system is connected to an Internet search engine that identifies the emerging subject of Internet search, the emerging subject is defined when a number of searches exceed a threshold for terms that relate to the emerging subject over a period of time.

16. The system of claim 15, wherein the system is configured to allow the users of the web site to contribute additional content to the web site.

17. The system of claim 15, wherein the engine of the web site indexes the content of the web site to allow the content of the web site to be searchable, and wherein the photo files and the video files of the web site are tagged to enable searching.

18. The system of claim 15, wherein the system is coupled to a user profile server to identify users of the web site, and is coupled to an advertisement server to include advertisements of the advertisement server in the web pages of the web site.

19. The system of claim 15, further comprising:

an event calendar storage for saving information of events related to the emerging subject.

* * * * *